(12) United States Patent
Brekelbaum et al.

(10) Patent No.: US 7,130,990 B2
(45) Date of Patent: Oct. 31, 2006

(54) EFFICIENT INSTRUCTION SCHEDULING WITH LOSSY TRACKING OF SCHEDULING INFORMATION

(75) Inventors: Edward A. Brekelbaum, Pflugerville, TX (US); Bryan P. Black, Austin, TX (US); Jeffrey P. Rupley, II, Round Rock, TX (US)

(73) Assignee: Intel Corporation, Santa Clara, CA (US)

( * ) Notice: Subject to any disclaimer, the term of this patent is extended or adjusted under 35 U.S.C. 154(b) by 507 days.

(21) Appl. No.: 10/334,528

(22) Filed: Dec. 31, 2002

(65) Prior Publication Data

US 2004/0128481 A1    Jul. 1, 2004

(51) Int. Cl.
*G06F 9/30*    (2006.01)
(52) U.S. Cl. ...................................... 712/214; 712/217
(58) Field of Classification Search ................ 712/214, 712/216–217
See application file for complete search history.

(56) References Cited

U.S. PATENT DOCUMENTS

2003/0140216 A1 * 7/2003 Stark et al. ................. 712/214

OTHER PUBLICATIONS

Sato, T. "A simulation of pipelining and decoupling a dynamic instruction scheduling mechanism." EUROMICRO Conference, 1999. Proceedings. 25th.*
Black, Bryan, Application for US Letters Patent for "Hierarchical Scheduling Windows", U.S. Appl. No. 10/261,578, filed Sep. 30, 2002.
Brekelbaum et al., "Hierarchical Scheduling Windows", Proc. 35th ACM/IEEE Int'l Symposium on Microarchitecture, 2002, pp. 27-36.
Sato et al., "Revisiting Direct Tag Search Algorithm on Superscalar Processors". Proc. 29th Ann. Int'l Symposium on Computer Archiecture, pp. 318-329, May 2002.

* cited by examiner

*Primary Examiner*—Eddie Chan
*Assistant Examiner*—Ryan Fiegle
(74) *Attorney, Agent, or Firm*—Shireen I. Bacon

(57) ABSTRACT

A method and apparatus are provided for providing ready information to a scheduler. Dependence information is maintained in a relatively small map table, with potential loss of information when dependence information exceeds available space in the map table. Ready instructions are maintained, as space allows, in a select queue. Tags for scheduled instructions are maintained in a lookup queue, and dependency information for the scheduled instruction is maintained in an update queue, as space allows. Ready information for instructions in a scheduling window is updated based upon the information in the update queue. Loss of instruction information may occur, due to space limitations, at the map table, lookup queue, update queue, and/or select queue. Scheduling of lost instructions is handled by a lossy instruction handler.

20 Claims, 8 Drawing Sheets

EFFICIENT INSTRUCTION SCHEDULING WITH LOSSY TRACKING OF SCHEDULING INFORMATION

BACKGROUND

1. Technical Field

The present invention relates generally to information processing systems and, more specifically, to the maintaining and forwarding of ready state information to instruction scheduler logic.

2. Background Art

The performance of many microprocessors is a function of, among other things, core clock frequency and the amount of instruction level parallelism (ILP) that can be derived from application software executed by the processor. ILP is the number of instructions that may be executed in parallel within a processor microarchitecture. In order to achieve a high degree of ILP, microprocessors may use large scheduling windows, high scheduling bandwidth, and numerous execution units. Larger scheduling windows allow a processor to more easily reach around blocked instructions to find ILP in the code sequence. High instruction scheduling bandwidth can sustain the instruction issue rates required to support a large scheduling window, and more execution units can enable the execution of more instructions in parallel.

Although large scheduling windows may be effective at extracting ILP, the implementation of these larger windows at high frequency is challenging. A scheduling window includes a collection of unscheduled instructions that may be considered for scheduling in a given cycle, and also includes associated tracking logic. The tracking logic maintains ready information (based on dependencies) for each instruction in the window. Instructions in the scheduling window may be surpassed in a given cycle if all dependencies for the instruction have not yet been resolved.

Large scheduling windows can imply relatively slow select and wakeup logic within an instruction scheduler (also referred to herein as "instruction scheduler logic"). For instance, a traditional large scheduling window includes logic to track incoming tag information and to record ready state information for unscheduled instructions. An example of a prior art scheduling model that uses a large scheduling window 110 is set forth in FIG. 1. Tracking incoming tag information and recording ready state information for all entries in a large scheduling window 110 can be inefficient in that, typically, only a small subset of all scheduling window entries require such processing at a given time. Another issue with typical large window 110 schemes is power consumption. For instance, many traditional large scheduling windows 110 are implemented with abundant content addressable memory (CAM) logic to track tag and ready state information for unscheduled instructions. The CAM requires significantly more power than other types of memory, such as standard RAM (random access memory). The embodiments of an efficient lossy instruction scheduling scheme described herein address these and other concerns related to traditional implementation of large scheduling windows.

BRIEF DESCRIPTION OF THE DRAWINGS

The present invention may be understood with reference to the following drawings in which like elements are indicated by like numbers. These drawings are not intended to be limiting but are instead provided to illustrate selected embodiments of a method and apparatus for forwarding ready state information to instruction scheduler logic.

DETAILED DISCUSSION

Figure 1:
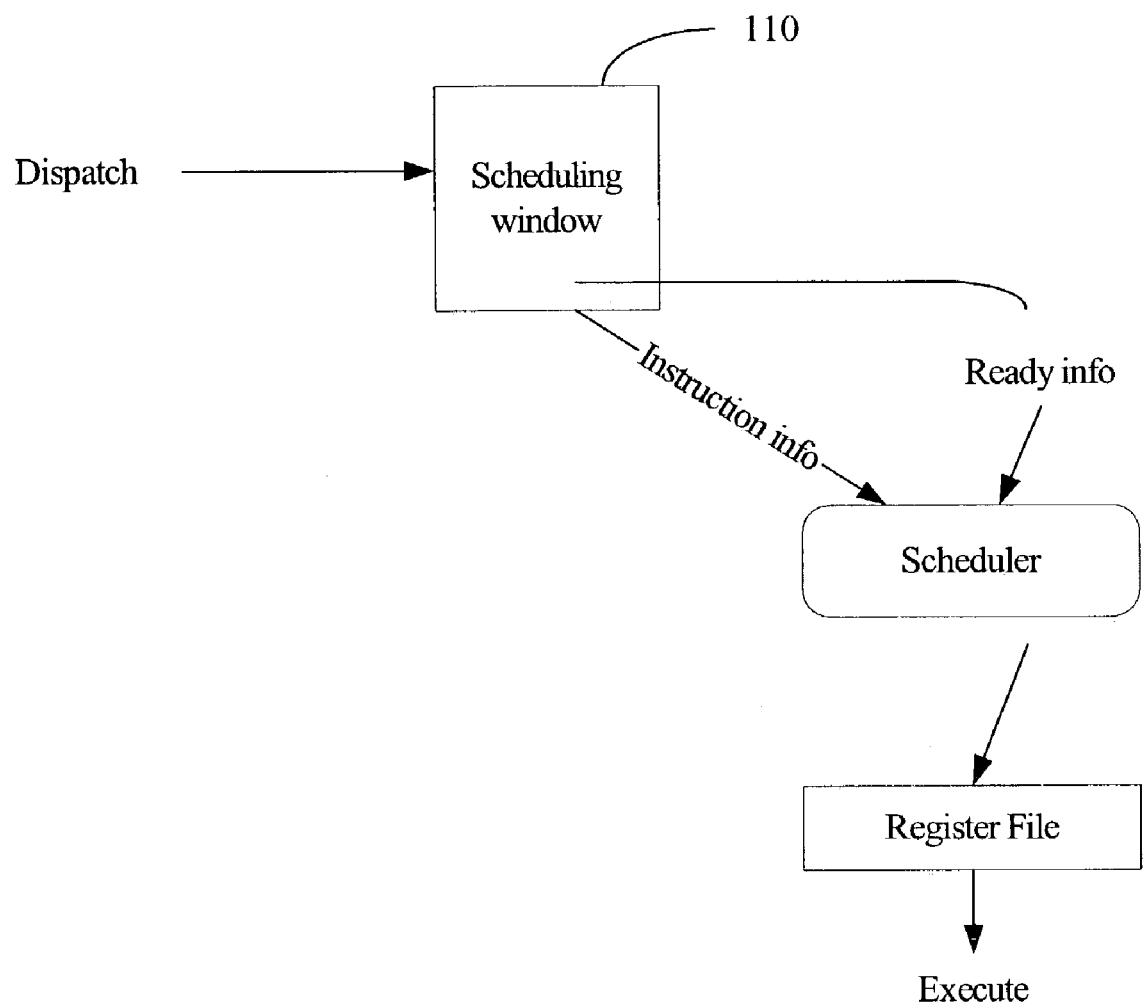
FIG. 1 is a block diagram of a traditional scheduling mechanism that utilizes a large scheduling window.
Figure 2:
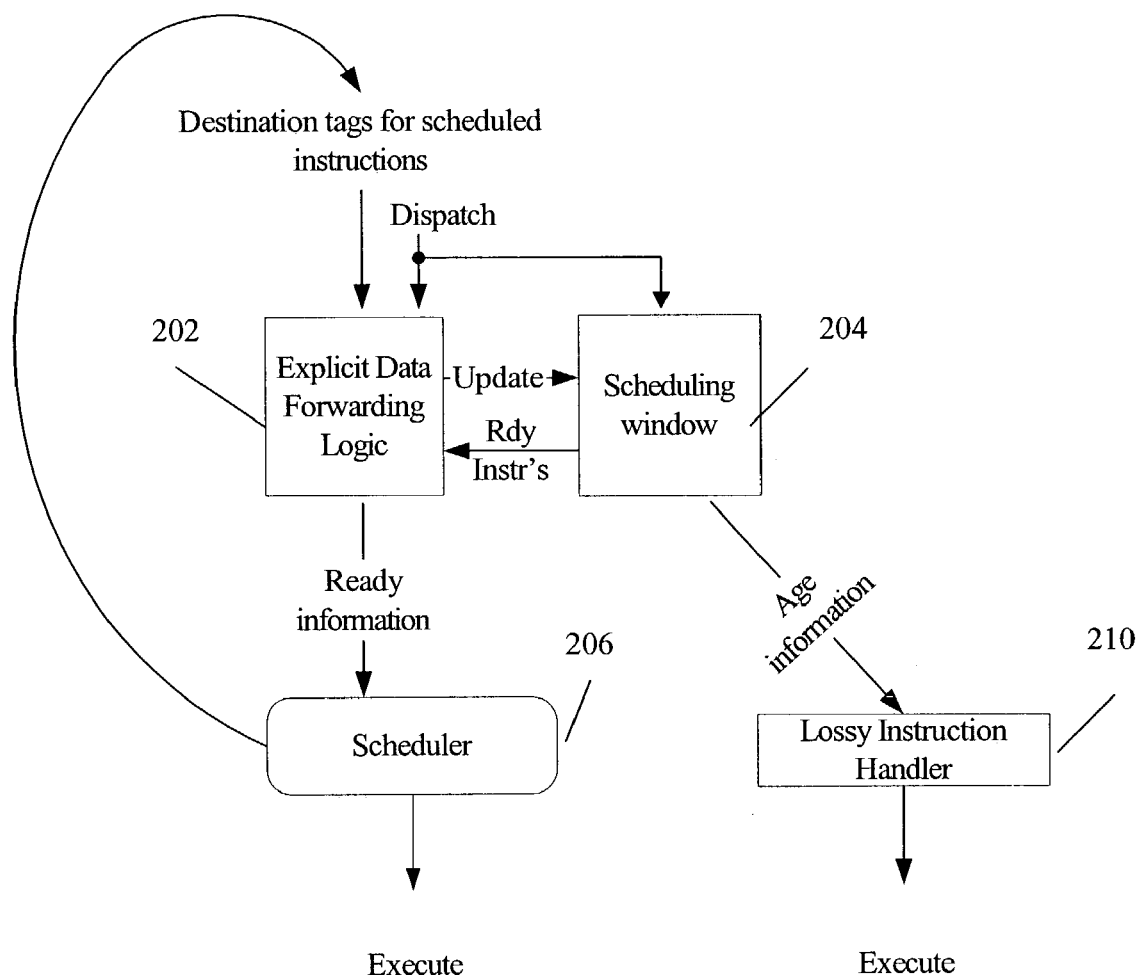
FIG. 2 is a block diagram of at least one embodiment of a scheduling scheme that includes lossy explicit data forwarding logic.

FIG. 2 is a block diagram illustrating a lossy instruction scheduling scheme that makes ready information available to a scheduler 206 without requiring the time-consuming and power-consuming process of looking through every entry in the scheduling window 204 to determine which instructions are "ready" for scheduling. As used herein, an instruction is "ready" for scheduling when all instructions providing source values upon which the instruction is dependent have been scheduled for execution. Accordingly, the dependent instruction is "ready" for scheduling when the current values of its source operands have been, or are currently scheduled to be, resolved. In other words, a dependent instruction is an instruction having one or more source operands that match the destination values of one or more other instructions, the other instructions occurring prior to the dependent instruction in the instruction stream.

FIG. 2 illustrates that at least one embodiment of an efficient lossy instruction scheduling scheme incorporates explicit data forwarding ("EDF") logic 202 and a lossy instruction handler 210. For at least one embodiment, the EDF logic 202 and lossy instruction handler 210 feed into separate execution clusters (not shown) that each has its own bypass network (not shown). Each execution cluster may include three integer units, as well as one load, one store, one branch, and one floating point unit. Each cluster receives local tag and data bypass. The bypass of the lossy instruction handler 210 is, in at least one embodiment, a small latency-critical network that bypasses data in the cluster fed by the lossy instruction handler 210. The smaller bypass network of the execution cluster of the lossy instruction handler 210 allows for tighter bypassing in the lossy instruction handler 210.

The lossy instruction handler 210 compensates for loss of information during processing in the explicit data forwarding logic 202. As is discussed in greater detail below, in connection with FIG. 3, one issue that may arise with the operation of explicit data forwarding logic is that information may be dropped, or "lost", during processing, resulting in a "lossy" system. For example, FIG. 2 illustrates that scheduling information may be tracked by the EDF logic 202. As used herein, the term "scheduling information" includes updated dependency information, ready status regarding waiting instructions, and destination tags for scheduled instructions (sometimes referred to herein as "scheduling status"). Depending on the queue sizes employed within the EDF logic 202, such information may be dropped. Loss of scheduling information during the tracking provided by the EDF logic 202 may cause an instruction to not be scheduled even though all dependencies have been resolved.

The explicit data forwarding logic 202 thus provides for lossy tracking of scheduling information among the components of the EDF logic 202. "Lossy" tracking indicates that, if sufficient capacity to store scheduling information in a storage structure of the EDF logic 202 is not available, the scheduling information is dropped or "lost."

There are a number of mechanisms that may be employed to schedule instructions about which information has been dropped by the explicit data forwarding logic 202. The mechanisms track some indicia to identify instructions that have been dispatched but not scheduled. At least one mechanism for scheduling of dropped instructions is a lossy instruction handler 210. The lossy instruction handler 210 tracks an indicator, such as age, of a waiting instruction. Should an instruction be dropped during processing by the explicit data forwarding logic 202 disclosed herein, the lossy instruction handler 210 schedules the dropped instruction.

At least one embodiment of a lossy instruction handler 210 includes a mover (not shown) and a fast scheduling window (not shown). The mover schedules the dropped instruction for execution in a separate scheduling window, referred to as the fast scheduling window. For at least one embodiment, a mover is a simple scheduler that selects a predetermined number of not-ready instructions from the scheduling window 204 and copies them to the fast scheduling window. For example, the mover might copy the three oldest not-ready instructions to the fast scheduling window.

For at least one embodiment, the mover is capable of selecting non-contiguous instructions from the scheduling window 204. At least one embodiment of the lossy instruction handler 210 includes a fast scheduler (not shown) that is responsible for scheduling instructions that have been placed in the fast scheduling window by the mover. One example of a lossy instruction handler capable of facilitating the scheduling of lossy instructions is disclosed in U.S. patent Ser. No. 10/261,578, filed Sep. 30, 2002, entitled "Hierarchical Scheduling Windows."

Figure 4:
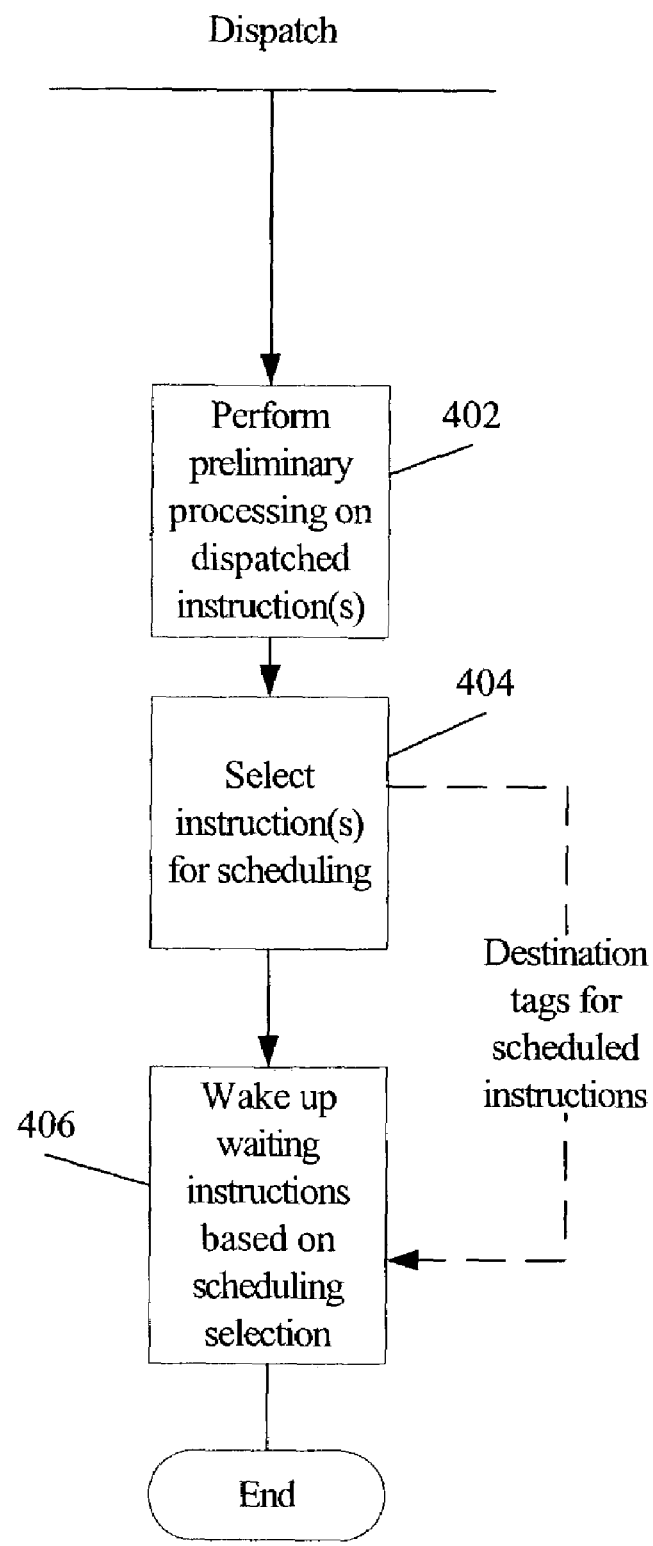
FIG. 4 is a flowchart illustrating at least one embodiment of a scheduling method.

Referring to FIG. 4, scheduling schemes typically include a select loop 404 and a wakeup loop 406. Preliminary processing 402 is performed on waiting instructions and the select loop processing 404 and wakeup loop processing 406 are performed.

Figure 3:
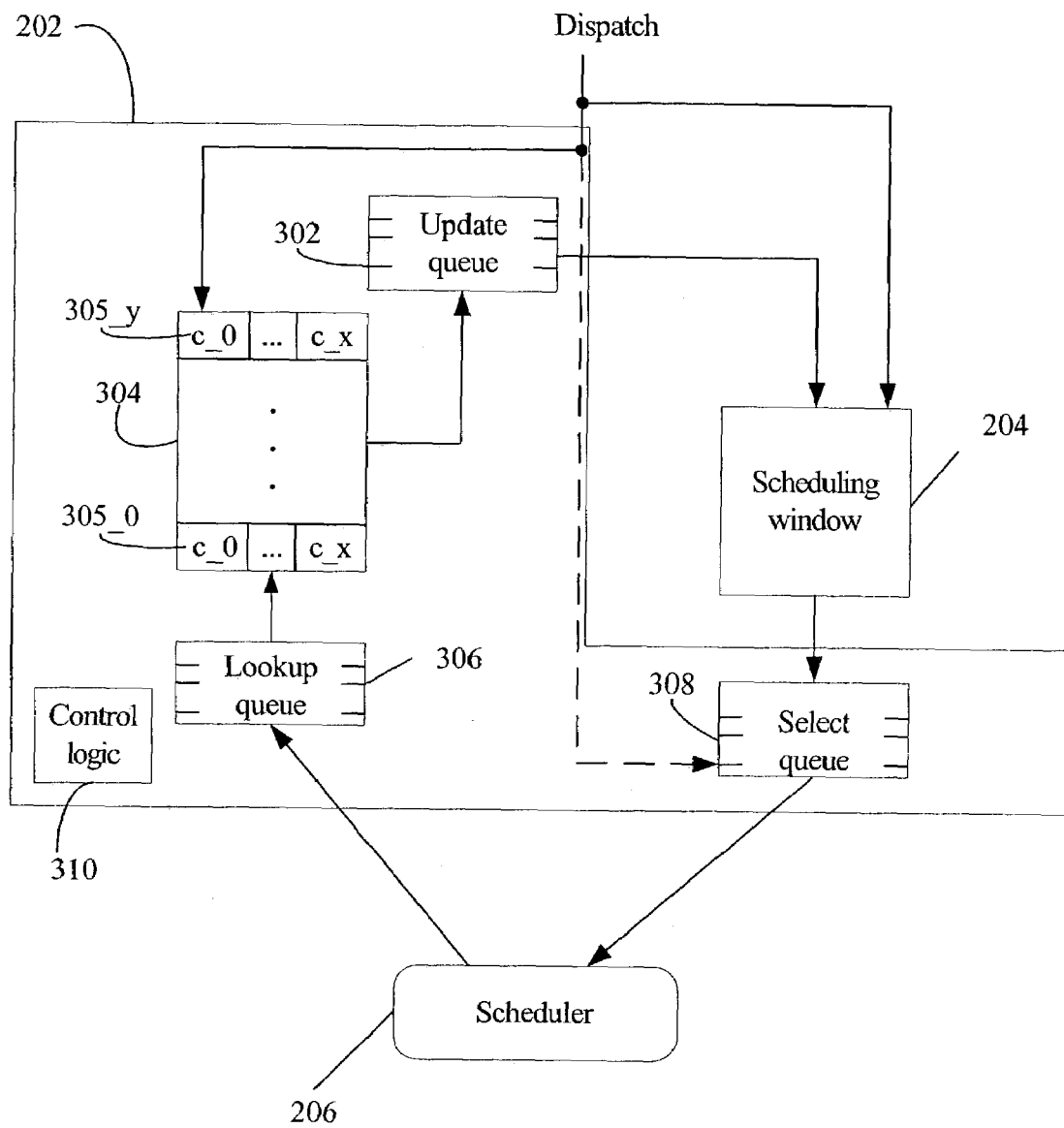
FIG. 3 is a block diagram of at least one embodiment of lossy explicit data forwarding logic.

The select loop 404 provides for maintaining a queue of information such as, for example, the select queue 308 illustrated in FIG. 3. The select queue 308 is used by the scheduler 206 to determine which instructions are "ready" and are therefore candidates for scheduling during the current machine cycle. The processing associated with the scheduler's 206 selection of one or more instructions from the select queue 308, and the attendant maintenance of the select queue 308, is referred to herein as the "select loop" 404, which is discussed in further detail below.

The processing associated with the wakeup loop 406 includes determination of whether a waiting instruction is ready for scheduling, and also includes updating the ready indication, as appropriate, when new instructions are scheduled. As new instructions are scheduled, the potential exists that values upon which other instructions are dependent will be provided by the destination value of the newly-scheduled instruction. If the newly-scheduled instruction provides the final (or only) value upon which another instruction depends, the dependent instruction can then be "awakened" and marked as "ready" for scheduling during the next cycle. In traditional scheduling schemes, the search for dependent instructions that are candidates to be "awakened," based on the scheduling of another instruction, involves searching all instructions in a scheduling window.

For at least one embodiment of the explicit data forwarding logic 202 (FIG. 2), a smaller set of potentially dependent candidate instructions may be tracked. This smaller set of candidates is maintained as a list in the map table 304 (FIG. 3). The lossy instruction handler may address information loss that results from the smaller set.

Throughout the discussion herein, the term "queue" is often used to refer to information that is maintained and manipulated during the select loop 404 and wakeup loop 406. One skilled in the art will recognize that, as used herein, the term "queue" is used generally to refer to any manner of storing a group of related data. It is not necessarily required that the queues discussed herein be implemented in a FIFO (first in first out) fashion, or that any particular organization of the data stored therein is to be implied by the term "queue."

A waiting instruction may contain some number of source operands. Because the waiting instruction cannot correctly execute until its source operands are available, the waiting instruction is considered to be a "consumer" instruction with respect to its source operands. Consumer instructions are sometimes referred to herein as simply "consumers." A prior-scheduled instruction that is expected to provide an operand value on which the waiting instruction depends is referred to as a "producer" instruction. Producer instructions are sometimes referred to herein simply as "producers." The terms "producer" and "consumer" are relative. One or more instructions may depend, for their source operands, on a destination operand of a producer instruction. Accordingly, a producer instruction may be associated with one or more dependent consumer instructions. Conversely, a waiting instruction with more than one source operand may be associated with several producer instructions; there may exist a producer instruction for each source operand of a consumer instruction. An instruction may be both a producer and a consumer.

FIG. 3 illustrates one embodiment for tracking producer and consumer scheduling information. The disclosed embodiment of EDF logic 202 may include the map table 304 as well as a lookup queue 306, an update queue 302 and a select queue 308. Control logic 310 controls forwarding and/or receipt of scheduling information among other components 304, 306, 302, 308 as well as receipt of scheduling information from a scheduler 206. The disclosed embodiment of map table 304 is a storage area. For at least one embodiment, the map table 304 may be implemented, for instance, as a storage structure including a group of storage locations in random access memory (RAM). Information may be stored in the map table 304 according to the logical organization illustrated in FIG. 3. That is, the map table 304 contains a predetermined number (n) of destination entries 305_0–305_y, each entry capable of tracking dependency information for a different destination register. An entry 305 is indexed in the map table 304 by a producer instruction's destination register so that each entry 305 represents one destination register. While a destination register identifier is used to identify and index entries in the map table 304, the actual destination register for a producer instruction need not necessarily be used. Instead, an identifier for each destination register is used. This distinction is relevant, for example, in systems that employ register renaming techniques.

For each destination, a predetermined number (x) of consumer instruction entries, c_0 through c_x, may be tracked in a map table entry 305. An approach for reducing search time in the map table is to reduce the size of x. For at least one embodiment, it has been determined that $6 \leq x \leq 8$ provides satisfactory performance. The desired value of x may be determined by modeling, design parameters, or the like.

For at least one embodiment, consumer instructions are tracked by placing the pointer associated with the consumer instruction into one of the consumer entries, c_0 through c_x, associated with the appropriate destination entry 305. The pointer for a consumer instruction that is tracked in a consumer entry, c_0 through c_x, is a pointer to the consumer instruction within the scheduling window 204. For at least one embodiment, placing (or dropping, as the case may be) a pointer for a consumer instruction into the map table 304 is accomplished by control logic 310.

"As used herein, 'dropped' is intended to mean that scheduling information that would otherwise have been forwarded from a first component (e.g., 304, 306, 302, 308) of the EDF logic 202 to a second component (e.g., 304, 306, 302, 308) of the EDF logic 202 was not placed into the second component (due to space constraints), but that the information will not be maintained in the first component and thus the scheduling information will be permanently 'lost'".

Figure 5:
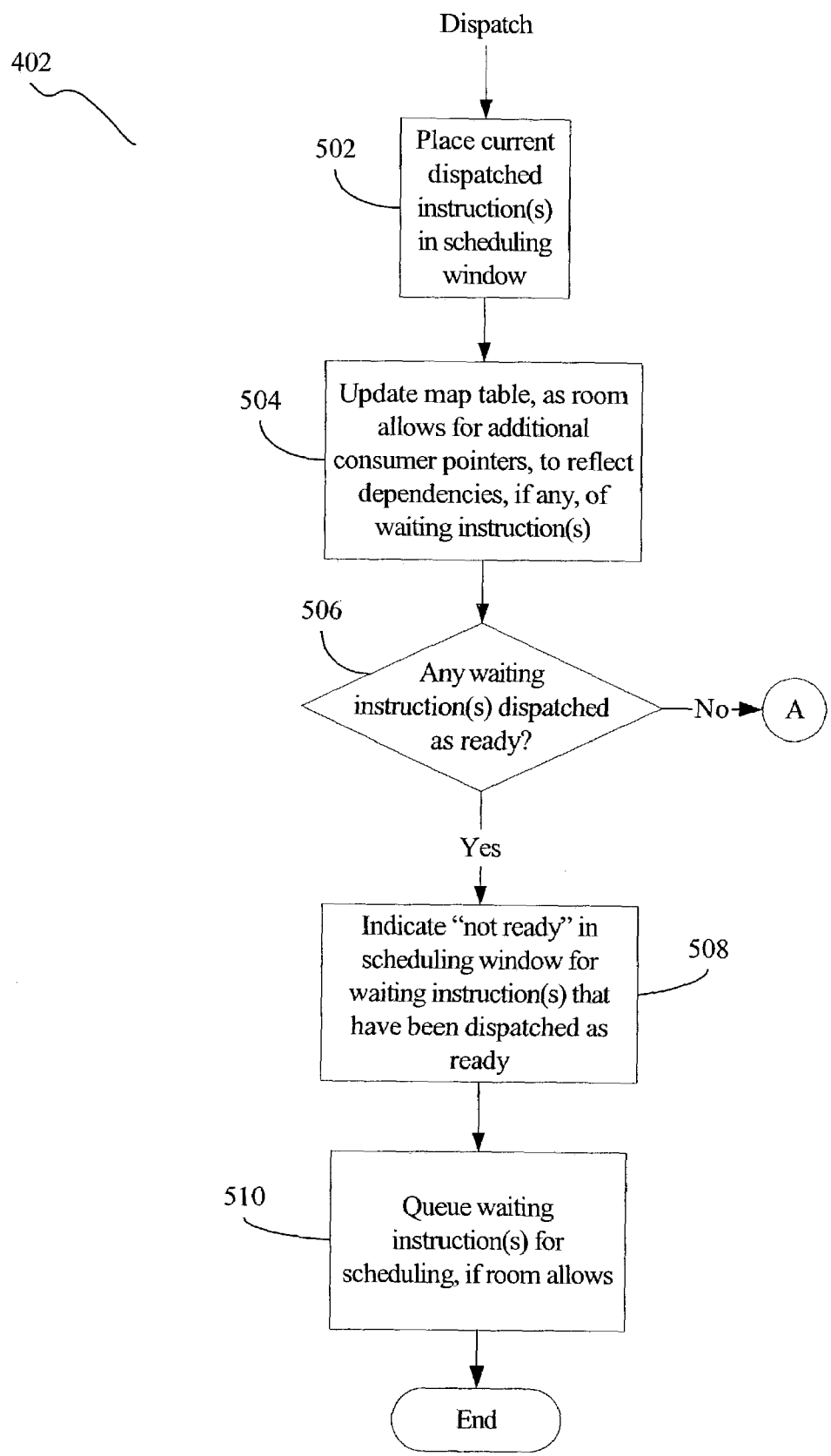
FIG. 5 is a flowchart illustrating at least one embodiment of a preliminary processing for a waiting instruction.

FIG. 5 illustrates one mechanism for preliminary processing (e.g., block 402 in FIG. 6) waiting instructions. At dispatch, the dispatched instruction becomes a waiting instruction that is entered 502 into a scheduling window (e.g., 204 illustrated in FIG. 3) and scheduling information about the dispatched instruction is provided 504 to the EDF logic 202 (FIG. 3). Entry 502 of the waiting instruction into the scheduling window 204 is performed in a known fashion, and is not necessarily performed by the EDF logic 202 (FIG. 3). At block 506 it is determined whether an instruction has been dispatched as ready. If not, processing proceeds at A. If an instruction has been dispatched as ready, it is marked 508 as not ready in the scheduling window so that it will not be re-processed in later cycles. Also, the instruction is queued 510 for scheduling. Although illustrated serially in FIG. 5, one skilled in the art will realize that blocks 508 and 510 need not necessarily be performed serially, but may performed in parallel or in an overlapping fashion, and may also be performed in a different order (i.e., block 510 is performed before block 508).

The method of FIG. 5 may be implemented in the structure shown in FIG. 5. Control logic 310 enters information into map table 304 in order to attempt to enter dependence information into the map table if i) dependence information is available and is needed to enforce dataflow order and ii) there is room in the map table 304 to hold such information. At dispatch, an instruction is a consumer with respect to its source operands, if any, and is a producer with respect to its destination operand, if any. The waiting instruction may be a type of instruction, such as a load or add instruction, for example, on whose destination values other later instructions may depend for their source operands.

For one embodiment, control logic 310 updates the map table 304 as follows. Each of the waiting instruction's source operands is located in the map table 304. If there is an available consumer entry (c_0 through c_x) in the destination entry 305, then the consumer information is recorded which, in effect, maps the waiting instruction as a consumer of the destination register. If there is no available consumer entry for the destination entry 305 in the map table 304 (that is, the consumer entries for a particular destination register are all filled with valid data), then the dependence information regarding that particular source operand of the waiting instruction is dropped, or "lost."

In some cases, including at the first cycle after an empty select queue is initialized (such as at power-up), an instruction is dispatched in a ready state. This condition is checked at block 506. If the condition check 506 evaluates to a "true" value, then the instruction has no dependencies and is ready for execution. In order to detect and handle such dispatched-as-ready instructions, the EDF control logic 310 determines 506 whether any of the current dispatched instructions have been dispatched in the ready state. If so, the ready instructions may be placed 510 into the select queue 308, which makes them available for scheduling during the current machine cycle. The ready indication for each current dispatched-as-ready instruction is modified in the scheduling window 204 to indicate the instruction is no longer available for scheduling. (It has already been made available to the scheduler and is no longer available for scheduling).

Control logic 310 attempts to place all current dispatched-as-ready instructions into the select queue 308. If the number of dispatched-as-ready instructions for the current machine cycle exceed the available entries in the select queue 308, then the excess dispatched-as-ready instructions are dropped. Because the ready indications for dropped dispatched-as-ready instructions are nonetheless modified in the scheduling window 204, the dropped instructions are "lost" from the scheduling scheme and will not be scheduled according to the select loop processing discussed below.

Scheduling such lost instructions is handled by the lossy instruction handler 210 (FIG. 2). For at least one embodiment, the lossy instruction handler 210 determines from the age of not-ready instructions in the scheduling window 204 that a not-ready instruction 1) has not been previously scheduled by the scheduler 206 and 2) is old enough (has been dispatched a sufficient number of instructions in the past) that it needs to be scheduled regardless of the not-ready indicator.

Referring to FIG. 4, after preliminary processing 402 for waiting instructions has been performed 402, select loop processing 404 is performed. Select loop processing 404 is at least one embodiment of an efficient scheduling approach that does not require query of every entry in the scheduling window 204 in order to determine those previously-dispatched (in the current cycle or a previous cycle) instructions that are "ready" and therefore available for scheduling.

Figure 6:
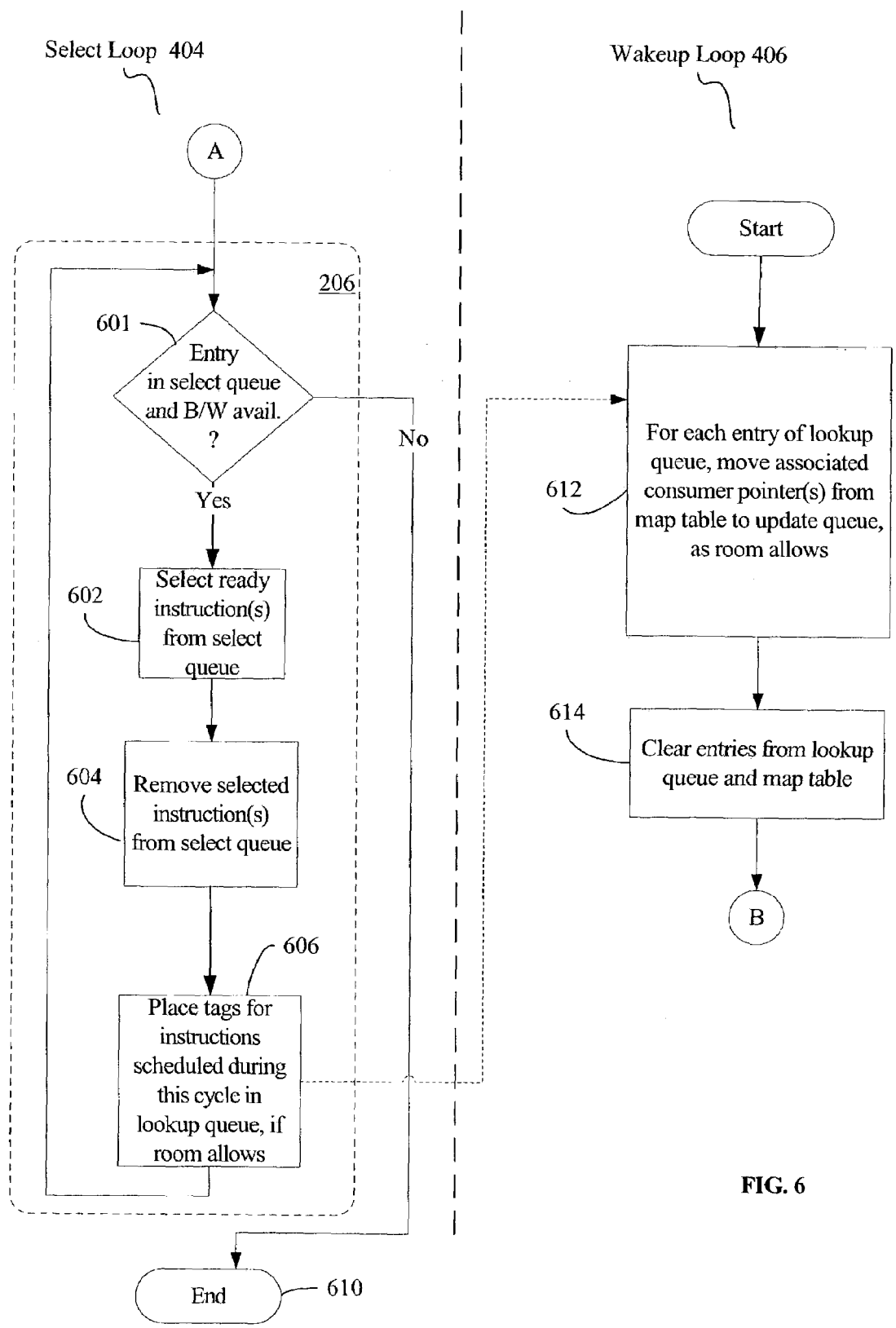
FIGS. 6 and 7 are flowcharts illustrating at least one embodiment of methods for performing lossy instruction scheduling and wakeup.

FIG. 6 illustrates that a scheduler 206 determines which instructions are ready for scheduling. For one embodiment, the scheduler 206 determines 601 whether one or more instructions are ready to be scheduled (e.g., one or more entries are present in the select queue 308 illustrated in FIG. 3) and the scheduler 206 has bandwidth available to schedule an additional instruction. If not, processing ends 610. However, if it is determined 601 that an instruction is ready and bandwidth is available, the scheduler 206 uses a heuristic to select 602 from among the ready instructions in each cycle. For at least one embodiment, the heuristic includes a simple in-order read of the first three entries in the select queue 308. For those instructions selected 602 for scheduling in the current cycle, their scheduling status is updated.

For one embodiment of the EDF logic 202 illustrated in FIG. 3, the scheduler 206 removes 604 the entries corresponding to the selected instructions from the select queue 308. Scheduling status for the selected instructions is updated by inserting 606 the destination tags for the instructions selected at block 602 into the lookup queue 306, room providing.

Processing returns to block 601, where it is determined if additional instructions should be processed during the current select loop 404. If the number of instructions selected 602 for scheduling in the current cycle exceeds the available remaining entries in the lookup queue 306, the exceeding entries are dropped at block 606 and are "lost." Scheduling for such lost instructions is handled by the lossy instruction handler 210, in the manner described above.

During select loop processing 612, the scheduler 206 enters 606 the destination tags for scheduled instructions to the lookup queue 306 (FIG. 3), as discussed above. The lookup queue 306 (FIG. 3) may be a storage structure that is also available to the EDF logic 202 during wakeup loop processing 406.

The EDF control logic 310 attempts to update 612 the map table 304 for each entry of the lookup queue 306. The destination tag for a lookup queue entry 306 is used to index into the map table 304 in an attempt to locate the appropriate map table entry 305. Accordingly, the map table lookup associated with block 612, which is based on tags from the lookup queue 306, serves to identify those instructions that depend on the destination value to be produced by an instruction selected 206 by the scheduler. For each consumer entry, c_0–c_x, associated with a currently-scheduled instruction, the consumer instruction's source operand that depends on the currently-scheduled instruction is now to be marked as "ready". Accordingly, the entry, including its attendant consumer pointers, is moved 612 to the update queue 302.

If there is no room remaining in the update queue 302, space limitations of the update queue have been exceeded. Excess consumer pointers are accordingly dropped and thus "lost". In either case, the tags are cleared 614 from the lookup queue 306 and map table 304. As with the other queues 306, 308 and map table 305 of the EDF logic 202, at least one embodiment of the update queue 302 is a storage structure including a group of storage locations in random access memory (RAM).

Figure 7:
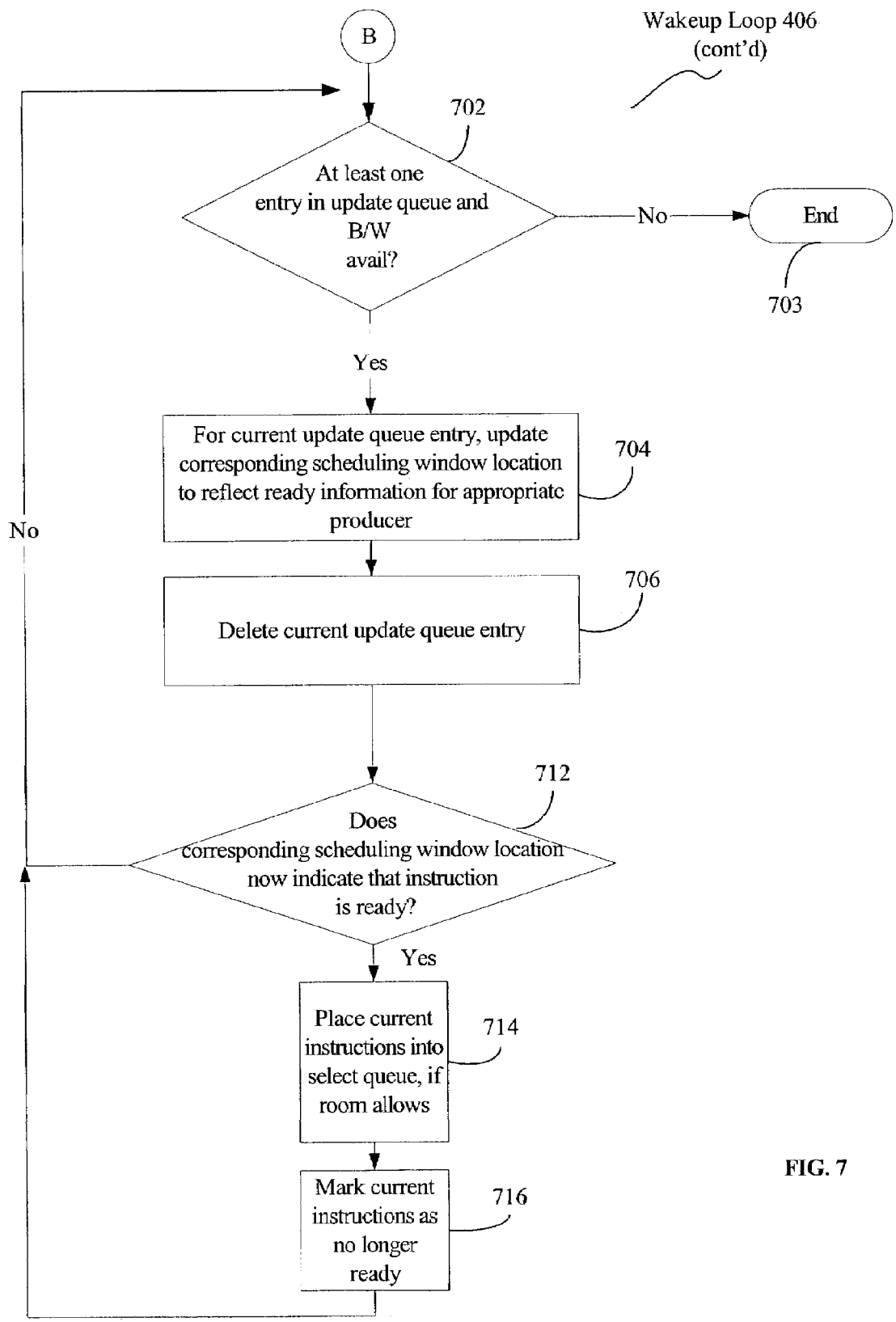

FIG. 7 illustrates additional processing of the wakeup loop 406 to perform update of ready information for instructions, based on the fact that new producer instructions may have been scheduled during execution of the select loop processing 404. The entries of the update queue 302 are processed; as long as there is further information to be processed from the update queue 302, and there is bandwidth available in the scheduling window 304, blocks 704 through 714 and 716 are performed. The check for further update queue 302 entries and available bandwidth is performed at block 702. If there are no more entries, or if there is no available bandwidth in the scheduling window 204, processing of the wakeup loop 406 ends 703. Processing may so end, for example, if all entries of the update queue have been processed. Also, processing of the wakeup loop 212 may end due to bandwidth limitations of the scheduling window 204.

For each entry of the update queue 302, one or more consumer pointers may be associated with the destination register associated with the update queue entry. For at least one embodiment, each valid consumer entry, c_0–c_x, contains a pointer to an instruction in the scheduling window 204. At block 704, each of these consumer instructions is updated to reflect a "ready" for the source operand dependent on the destination indicated in the update queue 302 entry. To do so, the appropriate instruction in the scheduling window 204 is located, based upon the pointer in the consumer entry c_0–c_x. The instruction entry in the scheduling window 204 contains, for at least one embodiment, a ready indicator for each source operand. The source operand ready indicator associated with the destination in the update queue 302 entry is modified to a "ready" state to indicate that the operand will now be available when the instruction is executed in a future cycle. At block 704, such processing is performed for all valid consumer entries, c_0–c_x, associated with the current update queue 302 entry. The update queue 302 entry is deleted 706. It is determined 712 whether the modification performed at block 704 now renders all source operands "ready" for any of modified instructions entry in the scheduling window 204. If so, the instruction in the scheduling window is considered to be "ready" and processing continues at blocks 714 and 716. If not, processing of the current update queue entry is complete and processing continues to block 702 to determine whether to process additional entries in the update queue 302. If not, processing ends 703. If so, processing proceeds to block 704 to process an additional entry in the update queue 302.

If the modification 704 of an instruction in the scheduling window 204, based upon an entry in the update queue 302, renders all source operands for an instruction "ready," then the ready status in forwarded from the scheduling window to the EDF logic 202, where the instruction is processed 714, 716 in order to place it into the select queue 308 and mark it as no longer being a candidate for scheduling. Although blocks 714 and 716 are depicted serially in FIG. 7, such processing may be performed, for at least one embodiment, in parallel. One skilled in the art will realize that blocks 714 and 716 also be performed in an overlapping fashion, and may also be performed in a different order (i.e., block 716 is performed before block 714).

For at least one embodiment, the processing discussed above in connection with blocks 508 and 510 of FIG. 5 is similar to the processing performed at blocks 714 and 716, respectively. That is, it is assumed that all newly-ready instructions will be placed 714 into the select queue 308, which makes them available for scheduling during the next machine cycle. Based on this assumption, the ready indication for each newly-ready instruction is modified 716 in the scheduling window 204 to indicate the instruction is no longer available for scheduling. EDF control logic 310 attempts to place 714 all newly-ready instructions into the select queue 308. If the number of newly-ready instructions for the current machine cycle exceed the available entries in the select queue 308, then the newly-ready instructions are dropped. Because the ready indications for dropped newly-ready instructions is nonetheless modified 716, the dropped instructions are "lost" from the scheduling scheme and will not be scheduled according to the select loop processing 612 discussed above. Scheduling such lost newly-ready instructions is handled by the lossy instruction handler 210 (FIG. 2) in any known manner.

Processing then continues at block 702 to process any remaining entries in the updated queue 302, as permitted by the bandwidth limitations of the scheduling window 204.

In sum, FIGS. 1 through 7 illustrate embodiments of a lossy instruction scheduling scheme that replaces the time-consuming and power-consuming full-window-lookup of traditional scheduling schemes with a simple lookup. Explicit data forwarding logic 202 and a scheduler 206 provide for lossy tracking of scheduling information. The scheduling information includes dependence information for consumer instructions as well as scheduling status for producer instructions. An update queue 302, as well as a select queue 308, map table 304, and lookup queue 306, may each be implemented in a relatively small and power-efficient portion of random access memory (RAM). As instructions are scheduled, their destination tags are inserted into the lookup queue 306, where they reside to await bandwidth access to the map table 304. In this manner, along with the maintenance of the update queue 302, scheduling status for a producer instruction is tracked.

At least one embodiment of the map table 304 maps destination registers to dependent instructions, maintaining several dependent instruction pointers per destination tag. For at least one embodiment, it has been determined that tracking 6–8 dependent consumer instructions per destination tag provides desirable performance. In addition, 4–6 read ports in the map table provide for desirable performance as well.

The consumer pointers in the map table 304 provide dependence information for consumer instructions. After the appropriate entry in the map table 304 is updated with information corresponding to the destination tag for a currently-scheduled instruction, consumer pointers, if any, for the dependent instruction are placed into the update queue 302. The update queue 302 thus tracks scheduling status for producer instructions because each entry in the update queue 302 represents a producer instruction that has been selected to be scheduled. For at least one embodiment, four update ports are provided in the update queue 302.

The instruction corresponding to each consumer pointer in the update queue 302 is located within the scheduling window 204 and is updated. If it is determined, from the updated information in the scheduling window 204, that the final outstanding dependency for a dependent instruction will be resolved by a currently issuing instruction, the dependent instruction is woken up and inserted in the select queue 308 to await scheduling by the scheduler 206, ending the wakeup loop 406. When an instruction is selected from the select queue 308 and scheduled 602, the wakeup loop 406 is performed again, as described above, in relation to the newly-scheduled instruction.

In the preceding description, various aspects of an efficient lossy instruction scheduling scheme have been described. For purposes of explanation, specific numbers, examples, systems and configurations were set forth in order to provide a more thorough understanding. However, it is apparent to one skilled in the art that the described embodiments may be practiced without the specific details. In other instances, well-known features were omitted or simplified in order not to obscure the embodiments.

Embodiments of an efficient lossy instruction scheduling scheme may be implemented in hardware. Alternatively, embodiments may be implemented in software, firmware, or a combination of such implementation approaches. Embodiments of the invention may be implemented on a system comprising at least one processor, a data storage system (including volatile and non-volatile memory and/or storage elements), at least one input device, and at least one output device. For purposes of this application, a processing system includes any system that has a processor, such as for example; a digital signal processor (DSP), a microcontroller, an application specific integrated circuit (ASIC), or a microprocessor.

Figure 8:
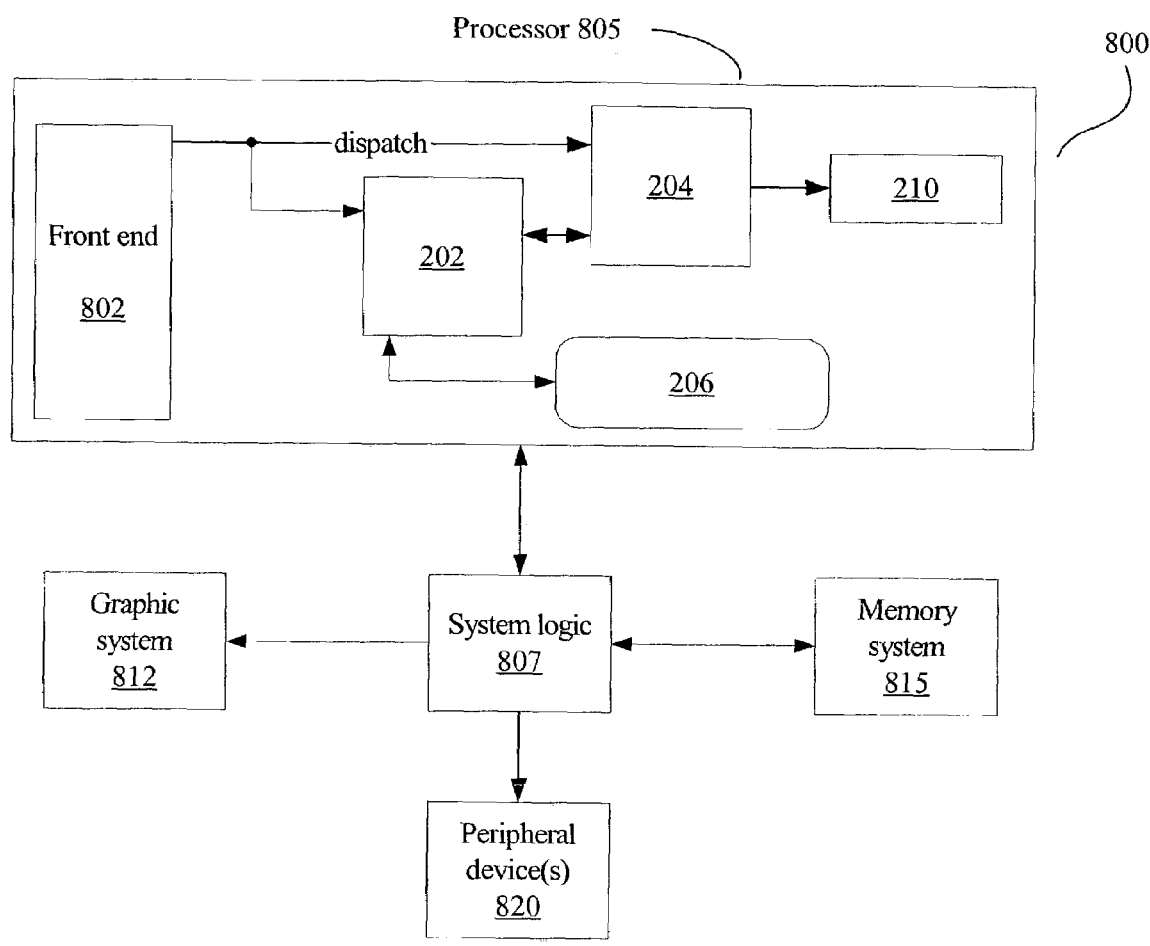
FIG. 8 is block diagram of an embodiment of a computer system in which at least one embodiment of a lossy instruction scheduling scheme may be implemented.

An example of one such type of processing system is shown in FIG. 8. System 800 may be used, for example, to execute at least one embodiment of a lossy method for forwarding ready information to a scheduler, as described herein. Sample system 800 is representative of processing systems based on the Pentium®, Pentium® Pro, Pentium® II, Pentium® III, Pentium® 4, Itanium® and Itanium® II microprocessors available from Intel Corporation, although other systems (including personal computers (PCs) having other microprocessors, personal digital assistants and other hand-held devices, engineering workstations, set-top boxes and the like) may also be used. In one embodiment, sample system 800 may be executing a version of the Windows™ operating, system available from Microsoft Corporation, although other operating systems and graphical user interfaces, for example, may also be used.

Referring to FIG. 8, sample processing system 800 includes a processor 805, memory system 815, one or more peripheral device(s) 820, graphics system 812, and system logic 807. System logic 807 manages the transfer of data among the various components of the system 800. Memory system 815 is intended as a generalized representation of a memory hierarchy that may include one or more caches. Memory system 815 may include a variety of forms of memory, such as a hard drive, CD-ROM, random access memory (RAM), dynamic random access memory (DRAM), static random access memory (SRAM) and related circuitry. While system 800 is shown with a single processor 805, embodiments of the lossy instruction scheduling scheme described herein may be implemented in multi-processor systems as well.

The disclosed embodiment of processor 805 includes EDF logic 202, scheduling window 204, scheduler 206 and lossy instruction handler 210. The disclosed embodiment of processor 805 also includes a front end 802 that fetches instructions and dispatches them to EDF logic 202 and also provides the fetched instructions to the scheduling window 204. For at least one embodiment, the front end 802 includes a decoder to dispatch the instructions. EDF logic 202 processes the waiting instructions as described above.

While particular embodiments of the present invention have been shown and described, it will be obvious to those skilled in the art that changes and modifications can be made without departing from the present invention in its broader aspects. The appended claims are to encompass within their scope all such changes and modifications that fall within the true scope of the present invention.

What is claimed is:

1. A method for scheduling instructions, comprising:
   placing an entry for a consumer instruction in a scheduling window,
   selecting a producer instruction to be scheduled;
   performing tracking of scheduling information in logic such that scheduling information for the consumer instruction is dropped due to capacity constraints before the consumer instruction is selected for scheduling;
   employing an instruction handler to schedule the consumer instruction, responsive to dropping the scheduling information during the lossy tracking.

2. The method of claim 1, wherein performing tracking of scheduling information further comprises:
   updating a storage area with scheduling information if capacity allows, and dropping the scheduling information if capacity is not available in the storage area.

3. The method of claim 1, wherein performing lossy tracking of scheduling information further comprises:
   performing tracking of scheduling status.

4. The method of claim 1, wherein performing tracking of scheduling information further comprises:
   performing tracking of ready status.

5. The method of claim 1, wherein performing tracking of the scheduling information further comprises:
performing tracking of dependence information for the consumer instruction.

6. The method of claim 1, wherein the entry for the consumer instruction further comprises:
one or more ready indicators, each ready indicator corresponding to one of one or more source operands of the consumer instruction.

7. The method of claim 6, further comprising:
selecting the consumer instruction for scheduling if each ready indicator indicates that the associated source operand is available.

8. The method of claim 1, wherein employing a instruction handler further comprises:
employing a instruction handler to schedule the consumer instruction, responsive to dropping a scheduling status for the producer instruction during the tracking.

9. The method of claim 1, wherein employing a lossy instruction handler further comprises:
employing a instruction handler to schedule the consumer instruction, responsive to dropping dependence information for the consumer instruction during the tracking.

10. The method of claim 1, wherein employing a instruction handler to schedule the consumer instruction further comprises:
scheduling the consumer instruction based on an age indicator.

11. A system, comprising:
a decoder to dispatch waiting instructions;
a scheduling window to maintain ready information for waiting instructions;
a first scheduler to determine, based on the ready information, that a waiting instruction is ready for scheduling;
logic, coupled to at least one storage area to hold scheduling information for a plurality of instructions, to track scheduling information if capacity is available;
the logic to drop, responsive to determination that capacity limitations of the at least one storage area have been exceeded, the scheduling information for one of the plurality of instructions before it has been selected for scheduling; and
a second scheduler to schedule waiting instructions for which scheduling information has been dropped by the logic.

12. The system of claim 11, wherein:
the logic is further to drop scheduling information responsive to determining that capacity limitations of an entry in a map table cannot accommodate dependence information for a consumer instruction.

13. The system of claim 11, wherein:
the logic is further to drop scheduling information responsive to determining that capacity limitations of a queue cannot accommodate scheduling information from a map table entry.

14. The system of claim 11, wherein:
the logic is further to drop scheduling information responsive to determining that capacity limitations of a queue cannot accommodate ready status for an instruction from the scheduling window.

15. The system of claim 11, wherein:
the logic is further to drop scheduling information responsive to determining that capacity limitations of a queue cannot accommodate a scheduling status from the scheduler.

16. An apparatus, comprising:
a table structure to track dependence information between a producer instruction and one or more consumer instructions;
a first queue structure to receive the dependence information from the table structure responsive to scheduling of the producer instruction by a scheduler;
a second queue structure to receive information regarding ready instructions from a scheduling window;
a scheduler to schedule ready instructions;
a third queue structure to maintain respective pointers to one or more unscheduled consumer instructions in the scheduling window; and
control logic to manage transfer of data among the table structure and the first, second and third queue structures wherein, the control logic is further to drop data responsive to determining insufficient capacity in one or more of the table structure and the first, second and third queue structures.

17. The apparatus of claim 16, wherein:
the control logic is further to provide forwarding of scheduling information to the table structure.

18. The apparatus of claim 16, wherein:
the control logic is further to provide forwarding of scheduling information from the scheduling window to the second queue structure.

19. The apparatus of claim 16, wherein:
the control logic is further to provide forwarding of scheduling information from the table structure to the first queue structure.

20. The apparatus of claim 16, wherein:
the control logic is further to provide receipt of scheduling information from the scheduler to the third queue structure.

* * * * *

UNITED STATES PATENT AND TRADEMARK OFFICE
CERTIFICATE OF CORRECTION

PATENT NO. : 7,130,990 B2 Page 1 of 1
APPLICATION NO. : 10/334528
DATED : October 31, 2006
INVENTOR(S) : Brekelbaum et al.

It is certified that error appears in the above-identified patent and that said Letters Patent is hereby corrected as shown below:

In column 10, at line 62, after "performing" delete "lossy".

In column 11, at line 19, after "employing a" delete "lossy".

Signed and Sealed this

Third Day of April, 2007

JON W. DUDAS
*Director of the United States Patent and Trademark Office*